(12) United States Patent
Howard et al.

(10) Patent No.: US 7,230,881 B2
(45) Date of Patent: Jun. 12, 2007

(54) SUBMARINE REMOTE SURFACE PLATFORM

(75) Inventors: Robert J. Howard, Clifton, VA (US); Thomas E. Digan, Manassas, VA (US); John W. Rapp, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 174 days.

(21) Appl. No.: 11/109,091

(22) Filed: Apr. 20, 2005

(65) Prior Publication Data

US 2006/0280034 A1    Dec. 14, 2006

(51) Int. Cl.
*H04B 11/00* (2006.01)
(52) U.S. Cl. ........................ 367/131; 367/134
(58) Field of Classification Search ................ 367/131, 367/134
See application file for complete search history.

(56) References Cited

U.S. PATENT DOCUMENTS

| | | | |
|---|---|---|---|
| 3,258,595 A | 6/1966 | Galante | |
| 4,227,479 A | 10/1980 | Gertler et al. | |
| 4,533,945 A | 8/1985 | Lauvray et al. | |
| 6,307,810 B1 | 10/2001 | Shany et al. | |
| 6,366,533 B1 | 4/2002 | English | |
| 6,961,657 B1 * | 11/2005 | Wernli et al. | 367/131 |

* cited by examiner

*Primary Examiner*—Dan Pihulic
(74) *Attorney, Agent, or Firm*—Mark A. Wurm; David D'Zurilla

(57) ABSTRACT

A platform with a sensor is for coupling to a submarine or other underwater vehicle and for sending data about the seascape to the submarine. In an embodiment, the platform is coupled to the submarine via a cable that has communication lines in it. The sensor may be attached to the platform via a mast. In an embodiment, the platform has a control surface, an anti-collision sensor, and a ballast. The platform allows a submarine to survey the seascape before rising to periscope depth.

15 Claims, 5 Drawing Sheets

SUBMARINE REMOTE SURFACE PLATFORM

TECHNICAL FIELD

The invention relates to the field of underwater vehicles, and in particular, but not by way of limitation, to apparatuses used in connection with underwater vehicles for viewing a seascape.

BACKGROUND

When a submarine comes to periscope depth it is at risk of collision with surface vessels since surface vessels that are in the vicinity of the submarine cannot always be detected with either active or passive acoustic means. Consequently, submarines routinely go to periscope depth, and make a rapid sweep of the seascape with the periscope. If nearby surface traffic is detected during the seascape sweep, the submarine will execute an "emergency deep" evolution.

Unfortunately, the periscope sweep at that low depth does not guarantee the avoidance of calamity. For if the submarine rises to periscope depth at the position of a surface vessel, a collision may be unavoidable. Such a collision will result in loss of life, economic damage, and political repercussions. The art is therefore in need of a device and system with which a submarine can check and monitor the seascape at a safe depth.

SUMMARY OF AN EMBODIMENT

In an embodiment, a remote platform that is tethered to a submarine or other underwater vehicle is released from the submarine and floats or actively rises up to the surface of the sea. The platform has a body, control surfaces, a ballast within the body, a sensor mast, and a sensor platform. A visual, UV, IR and/or RF sensing device is attached to the sensor platform, and captures and transmits image data to the submarine. The image is then displayed on a medium in the submarine. As a result, the submarine and its crew acquires information about the seascape before rising to periscope depth. Other platform embodiments and features are disclosed in the detailed description.

DETAILED DESCRIPTION

Figures 1A, 1B:
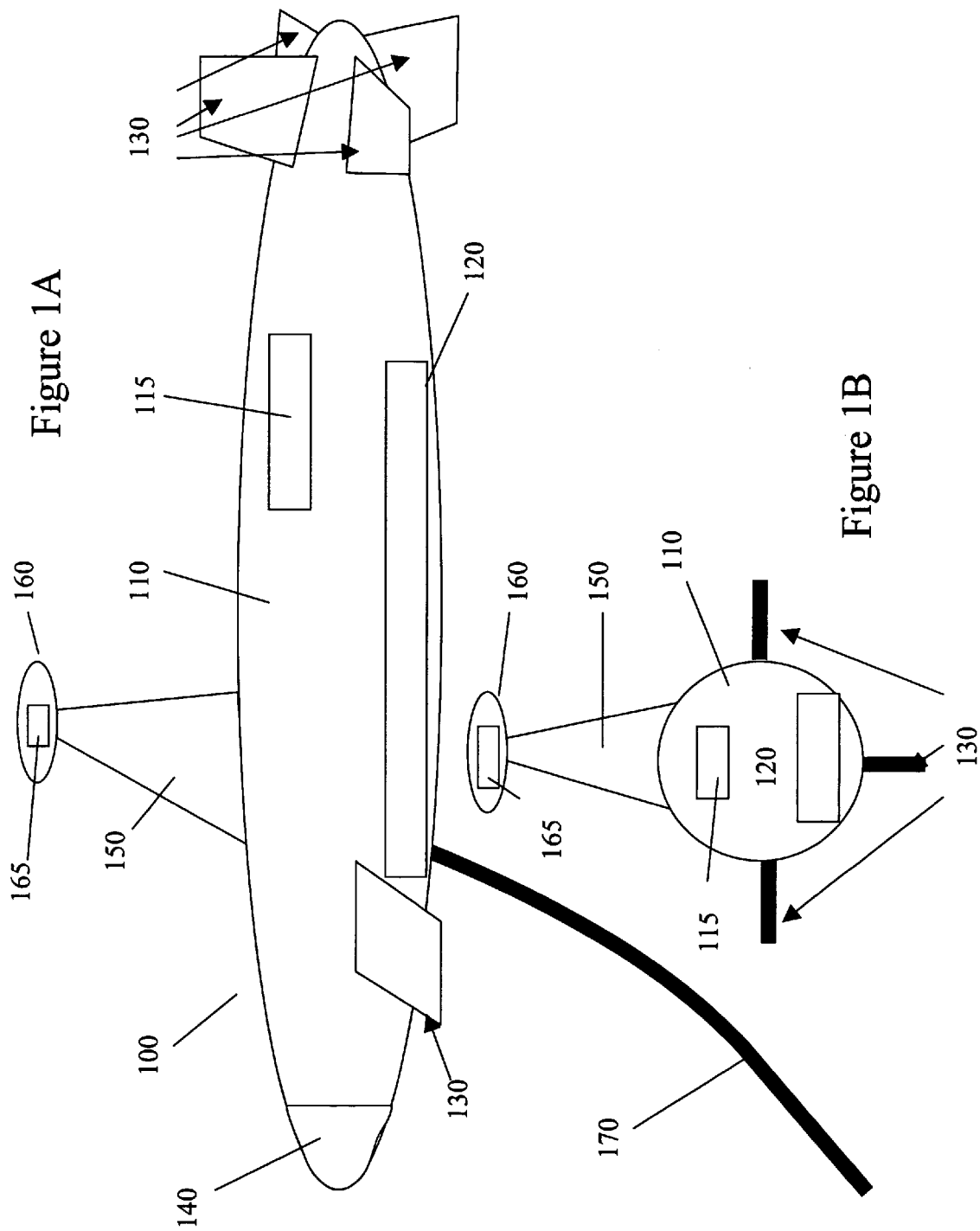
FIG. 1A illustrates a side view of an example embodiment of a remote surface platform for use in connection with a submarine or other underwater vehicle.
FIG. 1B illustrates a front view of the example embodiment of the remote surface platform of FIG. 1A.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

An embodiment of a submarine remote surface platform is illustrated in FIGS. 1A and 1B. The platform 100 has a body 110. Positioned within the body 110 is a ballast 120. Attached to the body 110 at a bow position and a stem position are control surfaces 130. An anti-collision system 140 is placed in the nose of the platform. In an embodiment, the anti-collision system is a SONAR system. In another embodiment, it is a LIDAR system. The platform may also have gyroscopes 115 to aid in the stabilization of the platform. Positioned on top of the body 110 is a sensor mast 150 with a gimbled sensor platform 160. A sensor 165 is attached to the platform 160. A cable 170 couples the platform 100 to a submarine or other underwater vehicle (not shown in FIG. 1). The cable 170 serves as both a tow cable to keep the platform physically connected to the underwater vehicle, and a data link to keep the platform intelligently connected to the underwater vehicle.

In an embodiment, the platform 100 is positively buoyant so that its depth may be controlled with minimal control surfaces and cable tension. In the embodiment of FIG. 1, the platform body 110 has a longitudinal shape in order to minimize 10 hydrodynamic drag, wake, and rooster tail effects. Persons of skill in the art will realize however that other shapes are possible, depending on the needs of the particular mission or application.

The sensor mast 150 deploys, via the sensor platform 160, a sensor 165 to gather information concerning the nature of the seascape. In an embodiment, the sensor is non-acoustic in nature, and is deployed above the sea surface (approximately four to five feet in one embodiment). Sensor modalities include video cameras, infrared cameras, LIDAR and short wavelength RADAR. The mast 150 can be implemented in a variety of ways. It can be a structure of steel or other durable material fixedly attached to the body 110. Alternatively, the mast can be articulated or it may telescope for deployment. The manner in which the mast 150 is deployed depends on the needs of the application.

In an embodiment, the platform 100 is powered by an on board battery within the platform, and/or power from the underwater vehicle through a power line in the cable 170. The cable 170 further has communication cables connecting the submarine with the platform. The communication cables could be either fiber optic and/or an electrical coax data link. However, it is preferred to used a fiber optic link because it is higher bandwidth and commensurately smaller in diameter.

Figure 2:
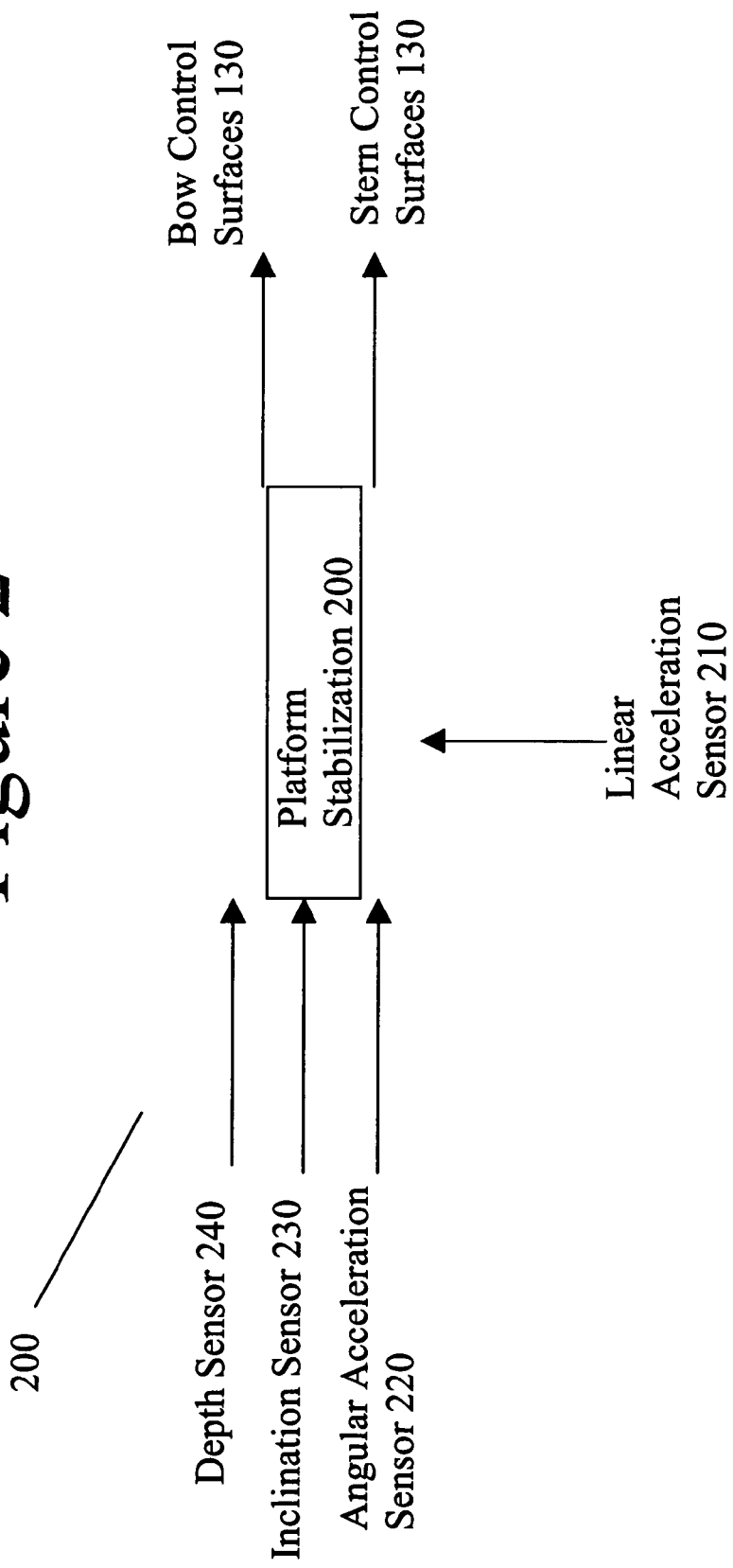
FIG. 2 illustrates an example embodiment of a stabilization module for a remote surface platform.

In an embodiment, stabilization of the platform is accomplished by a combination of gyroscopic stabilization and actuation of the control surfaces 130, and is illustrated in graphic form in FIG. 2. As illustrated in FIG. 2, a platform stabilization module 200 receives input from a linear acceleration sensor 210, an angular acceleration sensor 220, an inclination sensor 230, and a depth sensor 240. In addition to stabilization, the depth sensors 240 control the deployment and retrieval of the platform, and further control collision avoidance protocols. The stabilization module 200 processes this data, and transmits control signals to the control surfaces 130. The platform 100 is also passively stabilized by maintaining a generally round cross section for the submerged portion of the platform when it is surfaced. In this way, the center of buoyancy is maintained above the center of gravity. Such a round cross section also limits torques from wave action being coupled to the body. However, the relative location of the center of gravity and the center of buoyancy can be achieved with may body shapes and cross section shapes. In connection with this, in an embodiment, the weight of the mast 150 is kept low so as to keep the center of gravity as low as possible. In another embodiment, the platform includes six degrees of freedom acceleration sensors (three degrees of freedom for both linear and rotational acceleration). In addition to platform stabilization, the acceleration sensors and inclination sensors are used for image stabilization and inputs to the construction of the mosaic images. The inclination sensor output may also be used in forming a mosaic image for a 360 degree sensor scan mode. In another embodiment, recently developed camera packages that provide simultaneous, 360 degree coverage may be used to excellent advantage in connection with the platform. These cameras eliminate the need to scan with the cameras and simplify the design of the stabilized platform.

In an embodiment, a scuttle system is associated with the platform 100. The scuttle system causes the platform to sink if the tow cable breaks and the platform becomes separated from the submarine. In an embodiment, the scuttle system consists of a sensor that determines that the communication link with the submarine has been severed, and a destructive system that cripples and sinks the platform. In an embodiment, there is a delay in the activation of the scuttle system so as to allow a possible recovery of the platform, or to allow the submarine to vacate the area before the platform is disabled and sinks.

Figure 3:
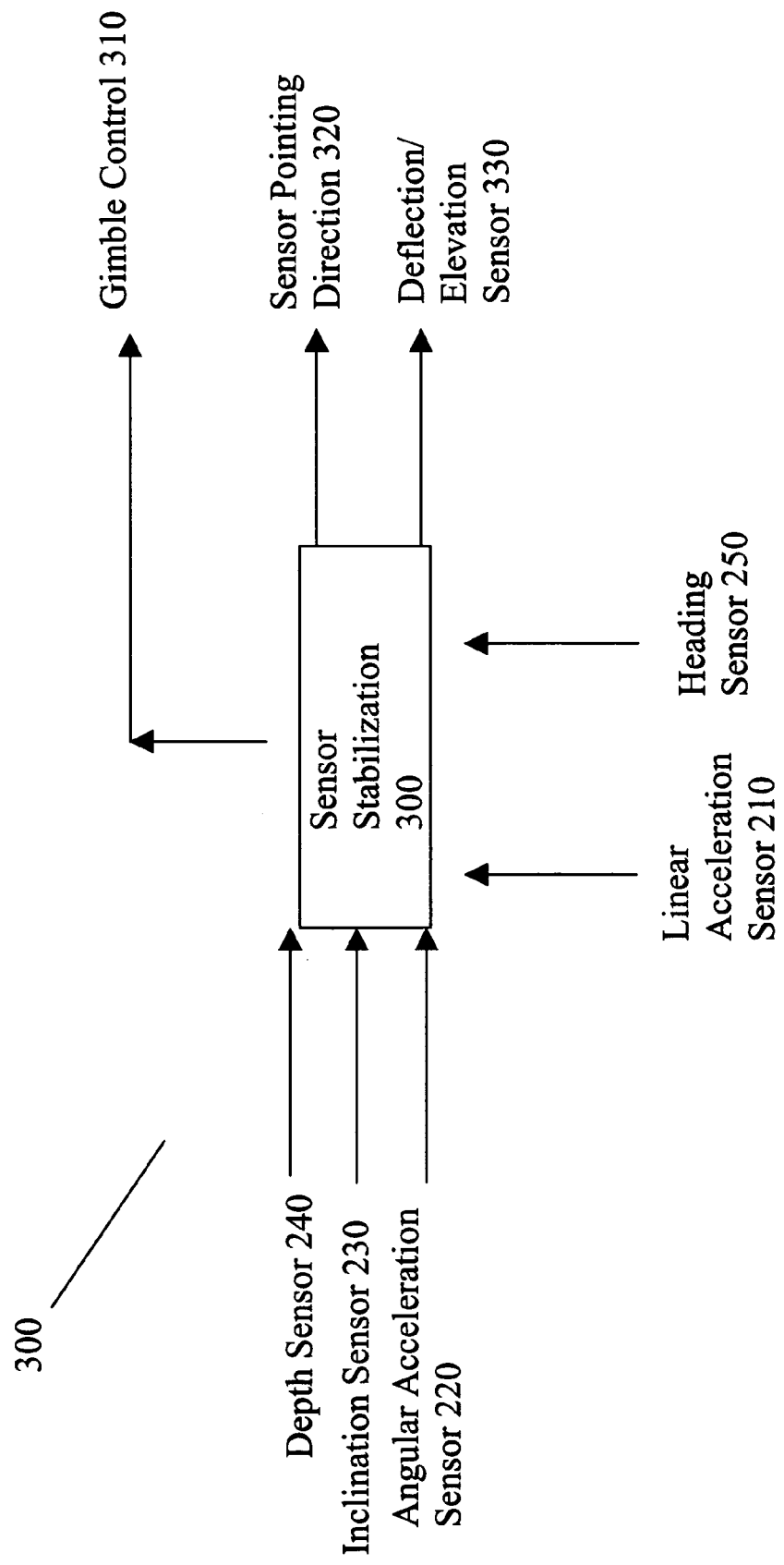
FIG. 3 illustrates an example embodiment of a stabilization module for a sensor on a remote surface platform.
Figure 4:
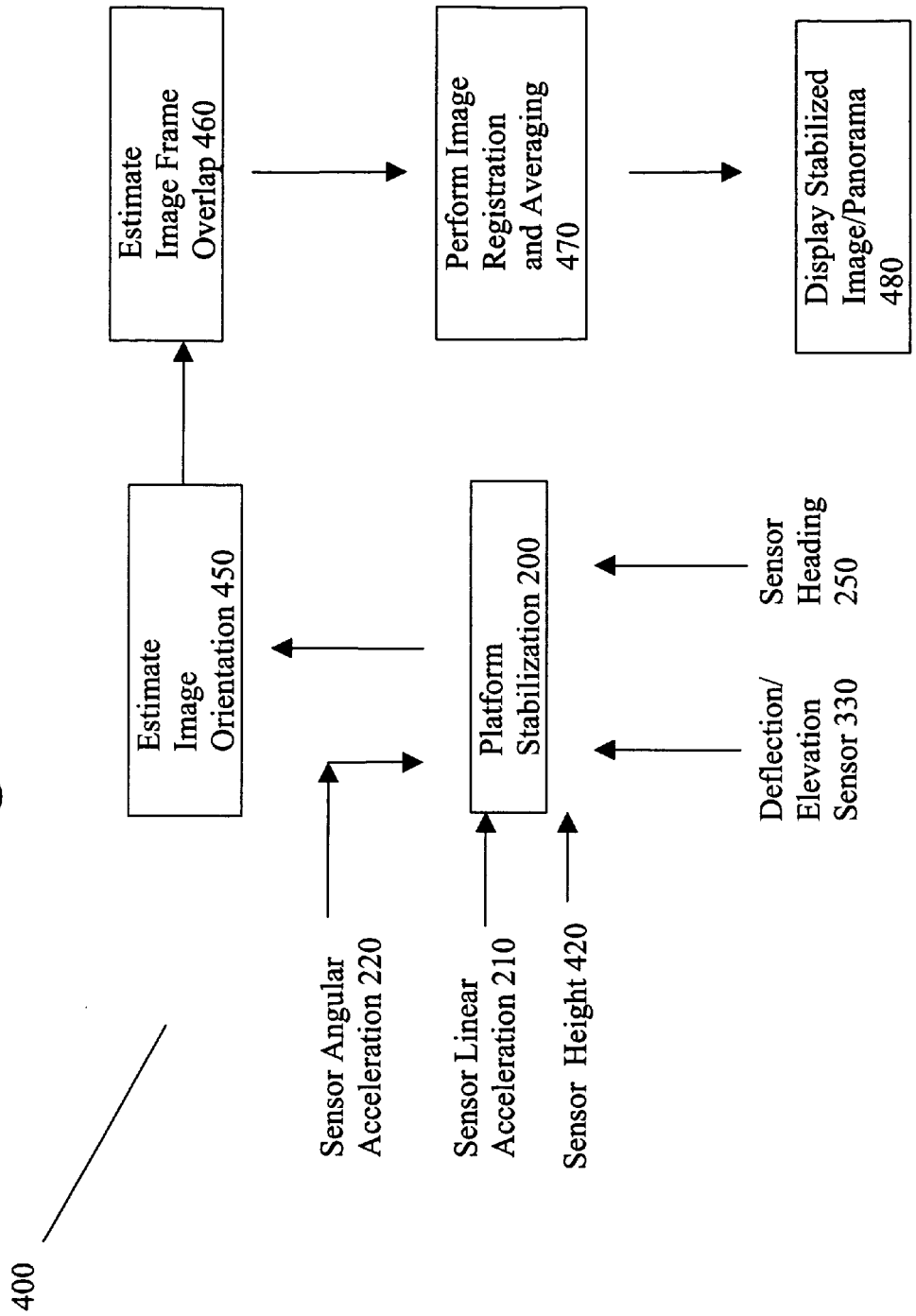
FIG. 4 illustrates an example embodiment of a stabilization module for a image processor on a remote surface platform.

FIGS. 3 and 4 illustrates example embodiments of a sensor stabilization module 300 and an image stabilization module 400. Referring to FIG. 3, a sensor stabilization module 300 receives input from the linear acceleration sensor 210, the angular acceleration sensor 220, the inclination sensor 230, the depth sensor 240, and a heading sensor 250. The heading sensor 250 may be a magnetic or inertial heading sensor integrated with the platform 100, and is helpful during maneuvers of the submarine by transmitting the platform heading to the submarine. The heading sensor is also used to orient the image displays on the submarine, to form the mosaic images on the submarine, and to stabilize the images that are transmitted from the sensor 165 to the submarine. The sensor stabilization module 300 processes this data, and transmits control signals to gimble control 310 that adjusts the angle of the sensor platform 160 relative to the horizon, a sensor pointing control 320 that adjusts the direction in which the sensor points, and a deflection/elevation angle sensor 330. FIG. 4 illustrates an example embodiment of an image stabilization system 400. In the system 400, the platform stabilization module 200 receives input from deflection/elevation angle sensor 330 and sensor heading 250. The platform stabilization module 200 uses these inputs to estimate the direction that the sensor platform 160 is pointing. The stabilization platform 200 also receives input from a height sensor 420, the linear acceleration sensor 210, and the angular acceleration sensor 220. The platform stabilization module 200 uses these inputs to estimate the height of the sensor (i.e. whether the sensor is in a wave trough or at a wave crest). The platform stabilization module uses all of these inputs to estimate the image orientation at 450 and the image frame overlap at 460. The module 200 then registers and averages the image at 470, and displays the stabilized image at 480. In one embodiment, the image is displayed in a panoramic view.

While it was noted earlier that the height of the mast 150 should be about four or five feet above the surface, greater heights will increase the distance that can be scanned. That is, on a calm or flat sea, the sensor range is approximated by:

$$1.3*\mathrm{sqrt}(\mathrm{sensor\ height}).$$

Therefore, a mast of four feet will have a range of approximately 2.6 nautical miles, a mast of height 25 feet will have a range of approximately 6.5 nautical miles, and a mast of height 160 feet will have a range of approximately 52 nautical miles. Additionally, there will be less interference from ocean froth as the height of the mast increases.

In an embodiment, a sensor deployed on the mast 150 will operate in one of two modes. A first mode is a rapid scan mode, wherein the sensor will scan the seascape in a 360 degree rotation. The rotation can be accomplished by rotating the camera itself, or pointing the camera at a rotating mirror. Imagery and data from the 360 degree scan is then displayed as a panoramic view on a suitable display medium, and may be a mosaic image. A second mode for the sensor is a dwell mode. In dwell mode, the sensor is steerable to a particular bearing, or it may be locked onto a particular contact. In the scan mode, the gimbled platform 160 has inclination and acceleration sensors to maintain the rotation of the sensor aligned in a plane that is parallel with the horizon as the platform 100 pitches and rolls with the sea.

Embodiments of the scan mode or dwell mode may use optical, infrared, and/or UV sensors. The use of both a visible sensor and a non-visible sensor provides redundancy in the system. Redundancy can also be built into a system through the use of LIDAR and RADAR. Both short wavelength RADAR and infrared cameras are useful under inclement weather conditions.

In another embodiment, the nose of a platform is equipped with anti-collision sensors 140. The anti-collision sensors 140 help to prevent a collision with a surface ship. In one embodiment the anti-collision sensor is a blue-green LIDAR. In another embodiment, it is an active SONAR. A LIDAR system may be combined with ultra-short light pulses and appropriate signal processing technology to increase the detection distance in turbid water. Active SONAR, at torpedo frequencies, can detect the hull of a surface vessel at ranges of 500 yards to 2,000 yards or more. Whichever mode is used, the anti-collision system 140 is coupled to a platform reeling system (for embodiments in which the mast 150 telescopes into the submarine). When the anti-collision system detects a potential collision, the reeling system will pull the platform in until it is below the keel depth of the surface vessel. This depth can determined by the anti-collision sensor 140, or it could be a known value stored by the system. Simultaneously, the control surfaces 130 will cause the platform 100 to execute a rapid dive. In an embodiment, the anti-collision sensors 140 are disabled while the platform is at or near the sea surface.

In an embodiment, the deployment of the platform 100 from the submarine is as follows. The platform should be deployed from the submarine at a safe operating depth, i.e. a depth that will insure no collision with a surface vessel. Before deployment, a sonar sweep may be used to identify any surface craft in the immediate area of the submarine. If a craft is found in the immediate area, the submarine should plot a course away from that area before deploying the platform.

The platform 100 is released from the submarine once deployment is authorized, although in one embodiment, an operator assumes command with a manual override. In an embodiment, the platform pauses just below the keel depth of most expected shipping traffic. The anti-collision system 140 is active in this deployment, but can be overridden by the operator if necessary. If the anti-collision system detects a vessel ahead of it or on a collision course with it, the platform will send a signal causing the reeling system to execute a rapid take in, and the platform itself will execute a rapid dive (using its control surfaces 130). These actions continue until the platform reaches a safe depth or the risk of collision is no longer present.

When the platform 100 safely reaches the surface, it deploys its sensor mast 150, sensor platform 160, and sensors 165 and begins transmitting data to the submarine. Once the operator identifies surface contacts transmitted by the sensors, the operator may initiate recovery of the platform and proceed to periscope depth. Or, the operator may proceed to periscope depth while automatically reeling in the platform. In either case, the recovery is automated, with the option of disabling the automatic reeling operations and performing them manually.

While on the surface, the platform is physically stabilized by using the acceleration sensors 210, 220 and inclination sensor 230 to actuate control surfaces 130. In an alternative embodiment, physical, gyroscopic stabilization may be employed in gyroscope 115.

Several embodiments are involved with the image displays and signal processing. Video and infrared data may be displayed as a panoramic view or a dwell view. In an embodiment, the panoramic display is composed of stabilized mosaic images as the sensor 165 rotates, although an operator may have the option of viewing the unstabilized images. The images are stitched together using a combination of image processing and physical stabilization techniques. The platform's acceleration, heading and inclination data is used for physical image stabilization. Thereafter, image processing stabilization is employed using the overlapping image segments as the video scans. Dwell images are subject to the same physical and image processing stabilization as the scanned images, except that the signal processing stabilization is performed frame to frame, with the platform attempting to maintain the camera pointed at a designated bearing or contact. LIDAR and RADAR are subject to the same physical stabilization as the video and infrared data. In an embodiment, de-clutter processing is applied to both LIDAR and RADAR.

Figure 5:
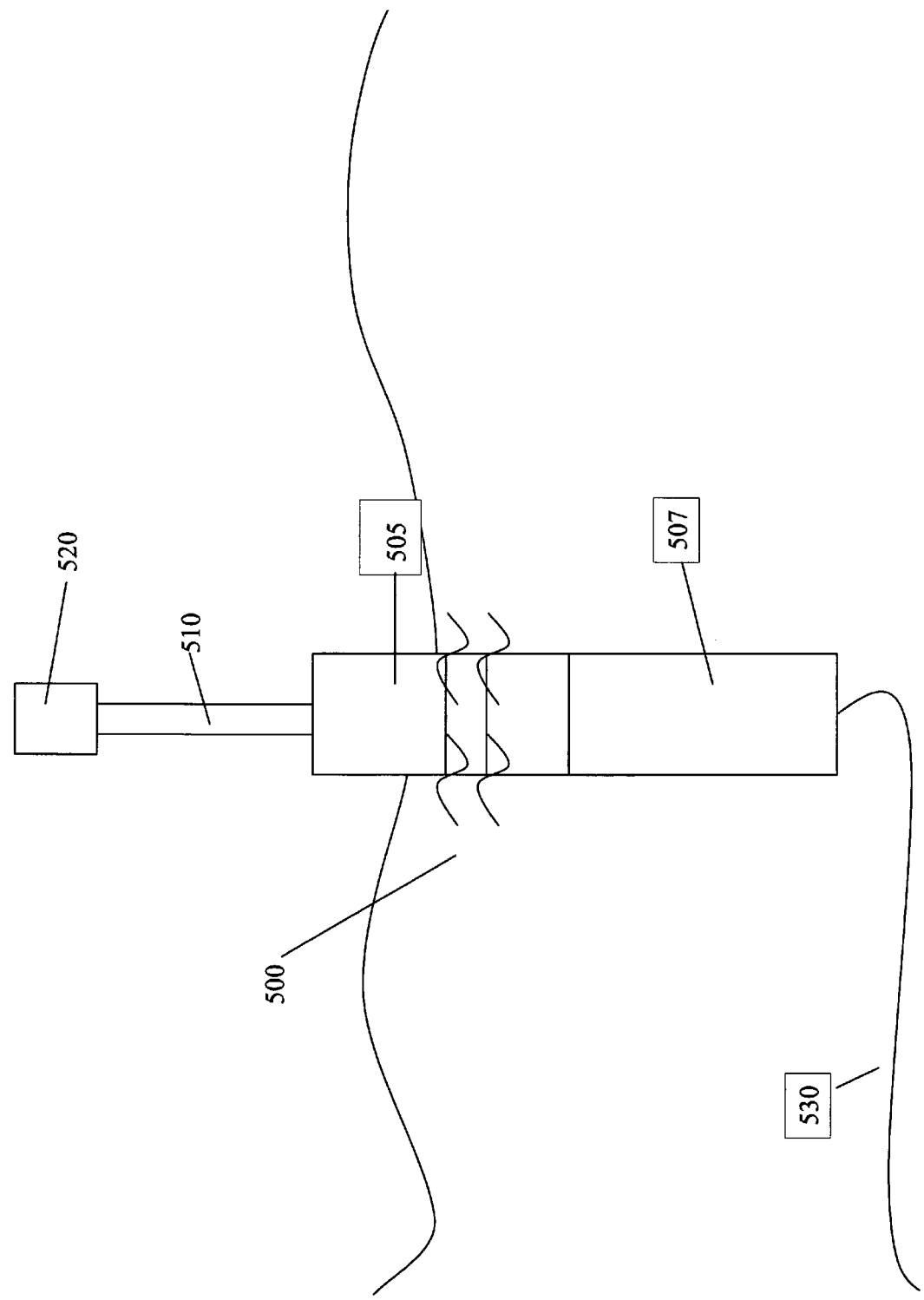
FIG. 5 illustrates another example embodiment of a remote surface platform for use in connection with a submarine or other underwater vehicle.

FIG. 5 illustrates an alternate embodiment of a remote surface platform that may be used in connection with a submarine. Referring to FIG. 5, a buoy-like platform 500 has attached thereto a mast 510 and a camera or other sensing device 520. The platform 500 has a floatation and electronics package in section 505, and a battery and/or other weight providing component in section 507. The weighted section 507 helps provide stabilization to the platform. The platform 500 is connected to the submarine via a fiber optic link 530. This embodiment is particularly suited to combination with recently developed 360 degree video cameras.

The platform 500 could be deployed through a signal ejector in a submarine (similar to an XBT). Unlike the embodiment of FIG. 1, the platform 500 would not be towed, but would rather remain stationary on the surface. As the submarine continued on its travel path, more fiber optic link cable would be reeled out until the submarines supply of cable was exhausted and/or the cable broke. Consequently, in an embodiment, the platform 500 would be expendable. The stabilization and image reconstruction modules, described in connection with the embodiment of FIG. 1, would also be used in connection with the platform 500.

In the foregoing detailed description of embodiments of the invention, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

The invention claimed is:

1. An apparatus comprising:
   a body;
   a mast connected to said body;
   a sensor platform connected to said mast, said sensor platform comprising a sensor for capturing image data;
   a cable, said cable coupling said body to an underwater vehicle, and said cable comprising communication lines for transmitting data from said sensor to said underwater vehicle;
   a ballast positioned in said body;
   a control surface attached to said body; and
   a gyroscope positioned within said body;
   wherein said ballast, said control surface, and said gyroscope function to transport, stabilize and position said underwater vehicle.

2. The apparatus of claim 1, further comprising a sensor stabilization module, said sensor stabilization module comprising input coupled to
   a heading sensor;
   a linear acceleration sensor;

an angular acceleration sensor;
an inclination sensor; and
a depth sensor; and
said sensor stabilization module comprising output coupled to:
a gimble control;
a sensor direction device; and
a deflection/elevation angle sensor.

3. The apparatus of claim 1, further comprising an image stabilization system, said image stabilization system coupled to and receiving data from:
a heading sensor;
a deflection/elevation sensor;
a height sensor;
a linear acceleration sensor; and
an angular acceleration sensor; and
said image stabilization system coupled to and sending output to:
an image orientation estimator;
an image frame overlap estimator;
an image registration and averaging module; and
an image display module.

4. The apparatus of claim 1, further comprising:
an anti-collision sensor positioned within said body; and
a reeling system.

5. The apparatus of claim 1, wherein said body comprises a longitudinal shape.

6. The apparatus of claim 1, wherein said sensor is selected from the group consisting of a video camera, an IR camera, a UV camera, a RADAR device, and a LIDAR device.

7. The apparatus of claim 1, further comprising an acoustic device.

8. The apparatus of claim 1, wherein said mast expands by telescoping out, and said mast collapses by telescoping in.

9. The apparatus of claim 1, further comprising a stabilization module, said stabilization module comprising inputs coupled to:
a linear acceleration sensor;
an angular acceleration sensor;
an inclination sensor; and
a depth sensor;
said stabilization module further comprising outputs coupled to said control surface.
a reeling system.

10. The apparatus of claim 1, further comprising a scuttle system, said scuttle system comprising:
a communication cable sensor; and
a destructive device.

11. An apparatus comprising:
a first section;
a second section, said first section and said second section connected along an edge;
a floatation section within said first section;
a stabilization mass within said second section;
a mast connected to said first section; and
a sensor connected to said mast;
wherein said stabilization mass provides said apparatus with the ability to remain upright in a body of water with said first section oriented above said second section and said first section remaining at least partially above said water, and said sensor remaining above said water.

12. The apparatus of claim 11, further comprising an electronics package positioned within said first section or said second section.

13. The apparatus of claim 11, further comprising a communication cable connected to said apparatus, said communication cable coupling said apparatus to an underwater vehicle.

14. The apparatus according to claim 11, wherein said sensor is a 360 degree camera.

15. The apparatus of claim 11, wherein said stabilization mass comprises a battery.

* * * * *